US007296089B2

(12) United States Patent
Krishnamurthy et al.

(10) Patent No.: US 7,296,089 B2
(45) Date of Patent: Nov. 13, 2007

(54) METHOD FOR IMPROVING WEB PERFORMANCE BY ADAPTING SERVERS BASED ON CLIENT CLUSTER CHARACTERIZATION

(75) Inventors: Balachander Krishnamurthy, New York, NY (US); Craig Ellis Wills, Shrewsbury, MA (US)

(73) Assignee: AT&T Corp., New York, NY (US)

( * ) Notice: Subject to any disclaimer, the term of this patent is extended or adjusted under 35 U.S.C. 154(b) by 705 days.

(21) Appl. No.: 10/213,611

(22) Filed: Aug. 7, 2002

(65) Prior Publication Data

US 2003/0046343 A1    Mar. 6, 2003

Related U.S. Application Data

(63) Continuation-in-part of application No. 09/705,675, filed on Nov. 3, 2000, and a continuation-in-part of application No. 09/603,154, filed on Jun. 23, 2000, now Pat. No. 6,928,485.

(60) Provisional application No. 60/346,366, filed on Nov. 9, 2001, provisional application No. 60/215,302, filed on Jun. 30, 2000, provisional application No. 60/234,511, filed on Sep. 22, 2000, provisional application No. 60/151,194, filed on Aug. 27, 1999.

(51) Int. Cl.
    *G06F 15/173* (2006.01)

(52) U.S. Cl. ...................................... 709/238; 709/238

(58) Field of Classification Search ................ 709/229, 709/220, 203, 238; 718/105
See application file for complete search history.

(56) References Cited

U.S. PATENT DOCUMENTS 5,651,099 A    7/1997  Konsella (Continued)

OTHER PUBLICATIONS

G. Cheung et al., Optimal Routing Table Design for IP Address Lookups Under Memory Constraints, IEEE Infocom '99 Proceedings, p. 1437-44 (Mar. 23, 1999).

(Continued)

*Primary Examiner*—Valencia Martin-Wallace
*Assistant Examiner*—Alan S Chou

(57) ABSTRACT

The present invention is a method for improving delivery of content to a client communicating with a server on the Web. Groups or clusters of clients are formed by processing the IP addresses of the clients according to a network-aware, radix-encoded trie classification process. The groups of clients are categorized based on information about one or more clients in each group that can be determined by the server. That information is used to help drive tailored actions on the part of Web servers. Users with poor connectivity may choose not to spend much time at a Web site if it takes a long time to receive a page, even if the Web server at the site is not the bottleneck. Retaining such clients may be of interest to a Web site. Better-connected clients may be able to receive enhanced representations of Web pages such as with higher quality images.

42 Claims, 10 Drawing Sheets

U.S. PATENT DOCUMENTS

| | | | |
|---|---|---|---|
| 5,706,507 | A | 1/1998 | Schloss |
| 5,835,720 | A | 11/1998 | Nelson et al. |
| 5,856,974 | A | 1/1999 | Gervais et al. |
| 5,937,160 | A | 8/1999 | Davis et al. |
| 6,000,020 | A | 12/1999 | Chin et al. |
| 6,006,259 | A | 12/1999 | Adelman et al. |
| 6,029,203 | A | 2/2000 | Bhatia et al. |
| 6,061,712 | A | 5/2000 | Tzeng |
| 6,067,545 | A | 5/2000 | Wolff |
| 6,078,954 | A | 6/2000 | Lakey et al. |
| 6,119,153 | A | 9/2000 | Dujari et al. |
| 6,131,067 | A | 10/2000 | Girerd et al. |
| 6,134,588 | A | 10/2000 | Guenthner et al. |
| 6,138,142 | A * | 10/2000 | Linsk ................... 709/203 |
| 6,182,121 | B1 | 1/2001 | Wiaschin |
| 6,192,417 | B1 | 2/2001 | Block et al. |
| 6,195,622 | B1 | 2/2001 | Altschuler et al. |
| 6,243,761 | B1 * | 6/2001 | Mogul et al. ............ 709/246 |
| 6,266,706 | B1 | 7/2001 | Brodnick et al. |
| 6,275,496 | B1 | 8/2001 | Burns et al. |
| 6,295,283 | B1 | 9/2001 | Falk |
| 6,304,895 | B1 | 10/2001 | Schneider et al. |
| 6,330,561 | B1 | 12/2001 | Cohen et al. |
| 6,343,320 | B1 | 1/2002 | Fairchild et al. |
| 6,396,842 | B1 * | 5/2002 | Rochberger .............. 370/408 |
| 6,412,008 | B1 * | 6/2002 | Fields et al. ............ 709/228 |
| 6,418,544 | B1 * | 7/2002 | Nesbitt et al. ............. 714/43 |
| 6,425,014 | B1 | 7/2002 | Aiken et al. |
| 6,470,389 | B1 | 10/2002 | Chung et al. |
| 6,529,508 | B1 | 3/2003 | Li et al. |
| 6,532,217 | B1 | 3/2003 | Alkhatib et al. |
| 6,546,424 | B1 | 4/2003 | Cucchiara |
| 6,549,538 | B1 * | 4/2003 | Beck et al. ............ 370/395.52 |
| 6,553,420 | B1 | 4/2003 | Karger et al. |
| 6,560,610 | B1 | 5/2003 | Eatherton et al. |
| 6,563,823 | B1 | 5/2003 | Przygienda et al. |
| 6,570,866 | B1 | 5/2003 | Murase et al. |
| 6,611,873 | B1 * | 8/2003 | Kanehara ................ 709/238 |
| 6,628,652 | B1 * | 9/2003 | Chrin et al. ............. 370/386 |
| 6,643,706 | B1 | 11/2003 | Marques et al. |
| 6,714,975 | B1 | 3/2004 | Aggarwal et al. |
| 6,725,261 | B1 | 4/2004 | Novaes et al. |
| 6,876,655 | B1 | 4/2005 | Afek et al. |
| 6,928,485 | B1 | 8/2005 | Krishnamurthy et al. |
| 6,965,943 | B1 * | 11/2005 | Golestani ................ 709/235 |
| 6,970,924 | B1 * | 11/2005 | Chu et al. ................ 709/224 |
| 2002/0118682 | A1 | 8/2002 | Choe |
| 2002/0129086 | A1 | 9/2002 | Garcia-Luna-Aceves |
| 2002/0198961 | A1 | 12/2002 | Krishnamurthy et al. |
| 2003/0046343 | A1 | 3/2003 | Krishnamurthy et al. |
| 2003/0236793 | A1 | 12/2003 | Karlsson |
| 2004/0059830 | A1 | 3/2004 | Brown |
| 2004/0085928 | A1 | 5/2004 | Chari et al. |
| 2004/0088571 | A1 | 5/2004 | Jerrim et al. |
| 2004/0090913 | A1 | 5/2004 | Scudder et al. |
| 2004/0128618 | A1 | 7/2004 | Datta |
| 2004/0153558 | A1 | 8/2004 | Gunduc et al. |

OTHER PUBLICATIONS

B. Kristnamurthy & C.E. Williams, Study of Piggyback Cache Validation for Proxy Caches in the WWW, Proc. of USENIX Symposium on Internet Tech. & Systems, Montery, CA Dec. 1997.
U.S. Appl. No. 09/603,154, filed Jun. 23, 2000.
U.S. Appl. No. 09/705,325, filed Nov. 3, 2000.
U.S. Appl. No. 09/705,675, filed Nov. 3, 2000.
U.S. Appl. No. 10/213,587, filed Aug. 7, 2002.
U.S. Appl. No. 10/254,378, filed Sep. 25, 2000.
O. Buyukkokten, et al., "Efficient Web Browsing on Handheld Devices Using Page and Form Summarization," ACM Transactions on Inform. Sys, vol. 20, Issue 1, pp. 82-115, 2002.
E. Kirda, "Web Engineering Device Independent Web Services," Proc. of 23rd Int'l Conf. on Software Engineering, pp. 795-796, Toronto, 2001.
C. Anderson, et al., "Personalizing Web Sites for Mobile Users," Int'l WWW Conf, Proc. of 16th Int'l conf. on World Wide Web, pp. 569-575, Hong-Kong, 2001.
R. Han, et al., WebSplitter: A Unified XML Framework for Multi-Device Collaborative Web Browsing, Proc. of 2000 ACM Conf. on Computer Supported Cooperative Work, pp. 221-230, Philadelphia, 2000.

* cited by examiner

SAMPLE SEQUENCE

| OBJECT NUMBER | RESPONSE CODE | CONTENT SIZE | DELAY (IN SEC.) FROM BASE OBJECT |
|---|---|---|---|
| 0 | 200 | 12221 | – |
| 1 | 200 | 183 | 2 |
| 2 | 200 | 1557 | 2 |
| 3 | 304 | 0 | 3 |
| 4 | 200 | 3322 | 4 |
| 5 | 200 | 2133 | 4 |
| 6 | 200 | 898 | 7 |
| 7 | 200 | 2803 | 8 |
| 8 | 304 | 0 | 11 |
| 9 | 200 | 400 | 11 |
| 10 | 200 | 2803 | 28 |

200

210

220

230

300 — EXTRACT IP ADDRESSES

310 — PERFORM LONGEST PREFIX MATCHING PROCESS ON IP ADDRESSES USING RADIX ENCODED TRIE

320 — CLUSTER IP ADDRESSES ACCORDING TO LONGEST PREFIX MATCHING

MATCHING CODE FOR THE <S,R,H> VALUES GENERATED BY THE FIRST PART OF THE ALGORITHM

```
/*
 * MULTI-LEVEL RETRIE LONGEST PREFIX MATCH
 *
 * INPUT ARGUMENTS:
 *
 *   S    TOP LEVEL SHIFT
 *   R    RETRIE INTERNAL NODES
 *   H    RETRIE LEAF NODES (NEXT HOP INDEX)
 *   addr IP ADDRESS TO MATCH
 *
 * RETURN:
 *
 *   0    NO MATCH
 *   >0   NEXT HOP INDEX
 */
int
lpmatch (uint8 S, uint32* R, uint8* H, uint32 addr)
{
    uint32    b;
    uint32    x;

x = R[addr >> S] ;
    while (b = x >> 27)
    {
        b = (x & ((1<<26)-1)) + ((addr>>(S-=b)) & (1<<b)-1));
        if (x & (1<<26))
        {
            x = H[b] ;
            break;
        }
        x = R[b];
    }
    return x;
}
```

FIG. 5A

```
/*
 * 2-LEVEL RETRIE LONGEST PREFIX MATCH
 *
 * INPUT ARGUMENTS:
 *
 *   S    TOP LEVEL SHIFT
 *   R    RETRIE INTERNAL NODES
 *   H    RETRIE LEAF NODES (NEXT HOP INDEX)
 *   addr IP ADDRESS TO MATCH
 *
 * RETURN:
 *
 *   0    NO MATCH
 *   >0   NEXT HOP INDEX
 */
int
lpmatch2 (uint8 S, uint32* R, uint8* H, uint32 addr)
{
  uint32    x;

x = R[addr >> S];
  return H [(x & ((1<<26)-1)) + ((addr & ((1<<S) -1)) >> (S-X>>27)))];
}
```

*FIG. 5b*

CLIENT CHARACTERIZATION

| PARAMETER | RANGE OF VALUE |
|---|---|
| SMOOTHING FACTOR α | 0.0, 0.3, 0.7 |
| POOR PERFORMING THRESHOLD ($E_{first}, E_{last}$) | (3,5), (5,8), (8,12) |
| CONFIDENCE LEVEL FOR CLIENT ACCESS | 1, 6 |
| USE OF CLIENT CLUSTERING | NO, YES |

| SERVER ACTION | NATURE OF SEQUENCES TO WHICH TO APPLY |
|---|---|
| 805 — REDIRECT TO REPLICA OR MIRROR | HIGH FIRST OBJECT DELAY |
| 810 — ALTER META-INFORMATION | PRESENCE OF UNNECESSARY 304 RESPONSES |
| 815 — ALTER CONTENT DELIVERY THROUGH SESSIONS OPEN LONGER | LONG SEQUENCE |
| 820 — ALTER CONTENT DELIVERY THROUGH COMPRESSION | LARGE CONTAINER DOCUMENT |
| 825 — REDUCE THE AMOUNT OF CONTENT | LONG SEQUENCE, LARGE CONTAINER DOCUMENT |

*FIG. 8*

| LOG | DURATION | NUMBER REQUESTS (MILLIONS) | NUMBER PAGE SEQUENCE | REFER AND AGENT FIELDS AVAILABLE? |
|---|---|---|---|---|
| largesite.com | 1 WK | 48.4 | 1210966 | YES |
| research.com | 1 MO | 5.2 | 250548 | YES |
| wpi.com | 1 WK | 6.0 | 270749 | NO |
| cs.wpi.com | 1 MO | 1.0 | 63007 | YES |
| bonetumor.org | 7 MO | 1.7 | 143867 | YES |
| aus.cricinfo.org | 1 WK | 3.3 | 175496 | NO |
| uk.cricinfo.org | 1 WK | 6.7 | 262254 | NO |
| usa.cricinfor.org | 1 WK | 2.2 | 98908 | NO |

FIG. 10 ACCESSES FROM CLIENTS CLASSIFIED AS POOR FOR SELECTED POLICIES (largesite.com)

| LOG | ALL | ALL MULTI | CLIENT CLASSIFIED RICH (% ALL GOOD) | ALL MULTI + CLUSTERS | CLIENT CLASSIFIED RICH + CL (% ALL GOOD) | CLIENT CLASSIFIED RICH,BAD PERF. (% ALL BAD) |
|---|---|---|---|---|---|---|
| largesite.com | 30.5 | 13.6 | 9.3(30.5) | 26.5 | 19.1(62.6) | 8.3(21.7) |
| research.com | 10.2 | 4.8 | 2.2(21.6) | 9.0 | 3.4(33.3) | 4.5(6.2) |
| wpi.com | 14.7 | 10.9 | 4.7(32.0) | 13.4 | 5.8(39.5) | 7.4(11.0) |
| cs.wpi.com | 9.2 | 3.8 | 1.7(18.5) | 4.4 | 1.8(19.6) | 2.4(3.0) |
| bonetumor.org | 29.3 | 16.9 | 9.8(33.4) | 25.4 | 14.8(50.5) | 9.5(19.8) |
| aus.cricinfo.org | 37.3 | 29.7 | 22.0(59.0) | 35.4 | 25.7(58.9) | 10.4(36.1) |
| uk.cricinfo.org | 35.2 | 26.5 | 19.9(56.5) | 33.8 | 25.0(72.0) | 10.6(30.9) |
| usa.cricinfor.org | 38.5 | 25.1 | 9.4(50.4) | 34.9 | 26.3(68.3) | 9.8(28.4) |

FIG. 11

| LOG | ALL | ALL MULTI | CLIENT CLASSIFIED RICH (% ALL GOOD) | ALL MULTI + CLUSTERS | CLIENT CLASSIFIED RICH + CL (% ALL GOOD) | CLIENT CLASSIFIED RICH,BAD PERF. (% ALL BAD) |
|---|---|---|---|---|---|---|
| largesite.com | 38.3 | 24.3 | 2.3(6.0) | 33.0 | 3.5(9.1) | 0.3(1.0) |
| research.com | 72.7 | 39.3 | 8.4(11.6) | 64.9 | 19.0(26.1) | 0.6(5.9) |
| wpi.com | 67.5 | 62.2 | 28.2(41.8) | 65.5 | 29.1(43.1) | 2.1(14.3) |
| cs.wpi.com | 78.8 | 53.8 | 21.0(26.6) | 60.9 | 26.0(33.0) | 0.4(4.3) |
| bonetumor.org | 47.9 | 27.1 | 3.2(6.7) | 41.1 | 5.8(12.1) | 0.6(2.0) |
| aus.cricinfo.org | 28.8 | 27.3 | 2.3(8.0) | 28.3 | 2.4(8.3) | 0.3(0.8) |
| uk.cricinfo.org | 34.3 | 27.6 | 3.8(11.1) | 32.4 | 4.4(12.8) | 0.4(1.1) |
| usa.cricinfor.org | 34.5 | 28.7 | 3.1(9.0) | 32.0 | 3.7(10.7) | 0.3(0.8) |

FIG. 12

| NUMBER OF CLIENT ACCESSES | CLIENT CLASS | | | TOTAL |
|---|---|---|---|---|
| | POOR | NORMAL | RICH | |
| 1-4 | 15.2 | 73.0 | 6.9 | 95.0 |
| 5-9 | 1.6 | 1.6 | 0.6 | 3.8 |
| 10-14 | 0.2 | 0.3 | 0.1 | 0.5 |
| 15-19 | 0.1 | 0.1 | 0.0 | 0.2 |
| 20-24 | 0.0 | 0.1 | 0.0 | 0.1 |
| 25+ | 0.1 | 0.2 | 0.0 | 0.3 |
| TOTALS | 17.2 | 75.2 | 7.6 | 100.0 |

FIG. 13

| LOG | REDIRECT TO REPLICA | ALTER META-INFORMATION | COMPRESS CONTENT DELIVERY | ALTER OBJECT DELIVERY | ALTER PAGE CONTENTS |
|---|---|---|---|---|---|
| largesite.com | 42 | 25 | 59 | 67 | 72 |
| research.com | 38 | 16 | 42 | 26 | 52 |
| wpi.com | 26 | 43 | 54 | 56 | 71 |
| cs.wpi.com | 31 | 17 | 50 | 29 | 68 |
| bonetumor.org | 37 | 10 | 83 | 3 | 84 |
| aus.cricinfo.org | 47 | 45 | 9 | 32 | 35 |
| uk.cricinfo.org | 59 | 39 | 10 | 20 | 23 |
| usa.cricinfor.org | 53 | 27 | 15 | 24 | 28 |

FIG. 14

METHOD FOR IMPROVING WEB PERFORMANCE BY ADAPTING SERVERS BASED ON CLIENT CLUSTER CHARACTERIZATION

This application claims the benefit of U.S. provisional application No. 60/346,366, filed on Nov. 9, 2001, the contents of which are fully incorporated herein by reference.

This application is a continuation-in-part of U.S. patent application Ser. No. 09/705,675 filed on Nov. 3, 2000, which claims benefit of U.S. provisional application No. 60/215,302, filed on Jun. 30, 2000 and U.S. provisional application No. 60/234,511, filed Sep. 22, 2000, the contents of which are fully incorporated herein by reference.

U.S. patent application Ser. No. 09/705,675 is a continuation-in-part of U.S. patent application Ser. No. 09/603,154 filed on Jun. 23, 2000, subsequently issued as U.S. Pat. No. 6,928,485, and which claims the benefit of U.S. provisional application No. 60/151,194 filed Aug. 27, 1999, the contents of which are fully incorporated herein by reference.

FIELD OF THE INVENTION

The present invention relates generally to the client-server model used extensively in the World Wide Web, and, more particularly, to a method for improving the performance of that model by characterizing clusters of clients and adapting servers based on that characterization.

BACKGROUND OF THE INVENTION

Web performance has been a key focus of research. User-perceived latency has a strong bearing on how long users will stay at a Web site and the frequency with which they return to the site. An entity that is trying to retain users at a Web site thus has a strong incentive to reduce the "time to glass" (the delay between the browser click and the delivery and display of the resource at the user's screen). For Web sites that have a critical need to retain users past the first page, there is a strong motivation to deliver the content quickly to the user. Given the vagaries of network delays, presence of intermediaries, and the users' connectivity, there is a need for servers to efficiently transmit content to clients.

A client may be interested in downloading only the HTML contents of the base page without any of the images in the container document. Often that is due to a poor level of client connectivity. Browsers permit this by allowing users to turn off images before downloading the resource. A page will typically load much faster if additional requests are not needed for the embedded objects. Depending on the number and sizes of the embedded objects, the overall download time of a container document can vary significantly. The download time of a container document (a base page plus all its embedded objects) has a visible impact on the user's perception of the Web site. A significant portion of users dissatisfied with the download time for a page may move on to another Web site. If a user with poor connectivity must wait a long time to load the most often visited pages on a Web site, the user might decide to stop visiting the site on a regular basis.

The present invention focuses on learning about the quality of a connection between a client and a server and on using that information in making a decision on how to serve content. The client's connectivity information may be obtained based on information already available at the server, or, alternatively, may be obtained actively by gathering information about the more dynamic components of the end-to-end delay, such as the bandwidth of the client or delays in the network.

Among the key reasons behind a client experiencing poor performance are low bandwidth, high latency, slow client, network congestion, delay at intermediaries between client and server, and a poorly equipped server. The present disclosure addresses those situations in which the server itself is not the primary performance bottleneck; otherwise the server could simply be upgraded. A server may not be able to isolate the reasons for a given client experiencing poor performance, but can nevertheless take remedial action. Improved performance in serving the content might result in the user being satisfied with the delivery speed and help retain the client for the Web site. Simply downgrading the quality of the content to achieve those results may not be as effective in retaining a client as other means that do not affect content quality.

The concept of dynamically adjusting multimedia content in a Web page depending on effective bandwidth and/or latency is suggested in U.S. Pat. No. 6,243,761 to Mogul et al. That patent discloses a method whereby a Web server monitors a variety of network characteristics (such as round trip time, resource utilization) between itself and the client and correspondingly adjusts the fidelity, or quality, of the content returned to the client so as to adjust the required bandwidth. The content is adjusted, for example, by adjusting image size, image resolution, or by compression. Each of those operations reduces the quantity of data to be sent to the client. In each case, however, the content arriving at the client has a corresponding reduction in quality as compared with the original content delivered to high-bandwidth users. Such a reduction in the quality of content may reduce client interest in a Web site, thereby reducing the effect of a decreased response time. Mogul et al. also teach making performance observations from previous connections to the same client, or from connections to clients that are "close" to each other.

In a paper entitled "SPAND: Shared Passive Network Performance Discovery," USENIX Symposium on Internet Technologies and Systems, Monterey, Calif., USA, December 1997, the authors disclose a system wherein a group of clients estimate cost to retrieve resources and share it amongst themselves. No action is taken on the part of the server.

Other work, presented in "Integrating User-Perceived Quality into Web Server Design," Proceedings of the Ninth Annual World Wide Web Conference, Amsterdam, Netherlands, estimates the tolerance of users for different levels of Web Quality of Service (QoS) in e-commerce. That work proposes that scheduling of requests at a Web server should take user expectations into account.

There is therefore a need for a method and system enabling a server to measure client performance and to adjust its actions to optimize content delivery to that client, without downgrading the content itself.

SUMMARY OF THE INVENTION

The present invention addresses those needs by providing a method for improving performance of a server delivering content to a client. The server and client communicate through a connection. In one embodiment of the present invention, a method is provided wherein a group of clients including the first client is formed by processing the IP addresses of the clients according to a radix encoded trie classification process. The group is classified into a group classification according to at least one criterion indicative of at least one connection through which content is delivered to at least one member of the group other than the first client. A request is received from the first client to serve content through the first connection. A response to the client request is altered in accordance with the group classification, and the response is sent to the client.

The response may be altered by altering the content to be delivered.

Alternatively, the response may be altered by altering the manner in which the content is delivered. In that case, the client may be redirected to a mirror server, or a length of allowed TCP sessions may be increased. Meta-information delivered with the content may be changed, resulting either in extending a freshness lifetime of an object in the content, or in altering a policy of including cache validation requests with other messages exchanged with the server. The content itself may be altered before delivery in an altered manner.

The step of classifying the group of clients according to a connection criterion may include placing the group in one of a poor, a normal and a rich class. In that case, the group is may initially be placed in the normal class.

The step of classifying the group of clients may include receiving client characterization information from at least one member of the group. The step of classifying may alternatively include measuring a time between accepting a TCP connection from the member of the group and receipt of a first HTTP request from that member.

The step of classifying the group of clients may include the steps of sending, in response to a client request from a member of the group, a redirect response, and measuring a time between the client request and a redirected client request from the member. The step of classifying may include measuring a time between transmittal of a container document to a member of the group and receipt of a first request for an object in the document, or receipt of a last request for an object in the document.

The classifying step may include measuring a criterion based on of a plurality of server requests. In that case, a criterion value $E_{first}$ may be adjusted based on a new measurement $E_{measured}$ according to a formula $E_{first} = \alpha E_{first} + (1-\alpha) E_{measured}$, wherein $\alpha$ is a smoothing value in a range from 0 to 1.

The client group may comprise a cluster of clients under common administrative control.

The method may include the further steps of generating a cookie containing a result of the classification step, and transmitting the cookie to the first client. The step of classifying the group of clients may include transmitting an executable to at least one of the clients for measuring the criterion indicative of a connection.

The step of altering the response to the client request may include maintaining the content without alteration.

The step of classifying the client according to a connection criterion may include placing the client in one of a poor, a normal and a rich class. In that case, the client may initially be placed in the normal class.

In another embodiment of the invention, a server is provided for delivering content to a first client through a connection. The server is configured to perform the steps of one or more of the methods described above.

These and other advantages of the invention will be apparent to those of ordinary skill in the art by reference to the following detailed description and the accompanying drawings.

BRIEF DESCRIPTION OF THE DRAWINGS

FIG. 5a shows an exemplary code implementation of a radix-encoded trie in accordance with one embodiment of the present invention.

FIG. 5b shows an exemplary code implementation of a radix-encoded trie in accordance with another embodiment of the present invention.

FIG. 8 is a table showing applicability of server actions to sequences with bad performance according to an embodiment of the invention.

FIG. 10 is a graph showing characteristics of sample accesses from clients.

FIG. 11 is a table of statistics from a log showing results of a client classification study.

FIG. 12 is another table of statistics from a log showing results of a client classification study.

FIG. 13 is a table of classifications of clients in a sample log.

FIG. 14 is a table showing the application of server actions from a sample log.

DETAILED DESCRIPTION

The present invention provides methods for classifying clients in a stable manner into a small number of categories, and provides a set of actions to be taken by a server based on the classification. As demonstrated below, those actions result in meaningful improvements. Once a client has been characterized, it is necessary to map that characterization to an appropriate action for the server. Well-connected clients may require no change in the actions taken by a server. Additionally, grouping clients, and specifically the use of network-aware clustering, may be effective for classification and application of server actions.

Figure 1:
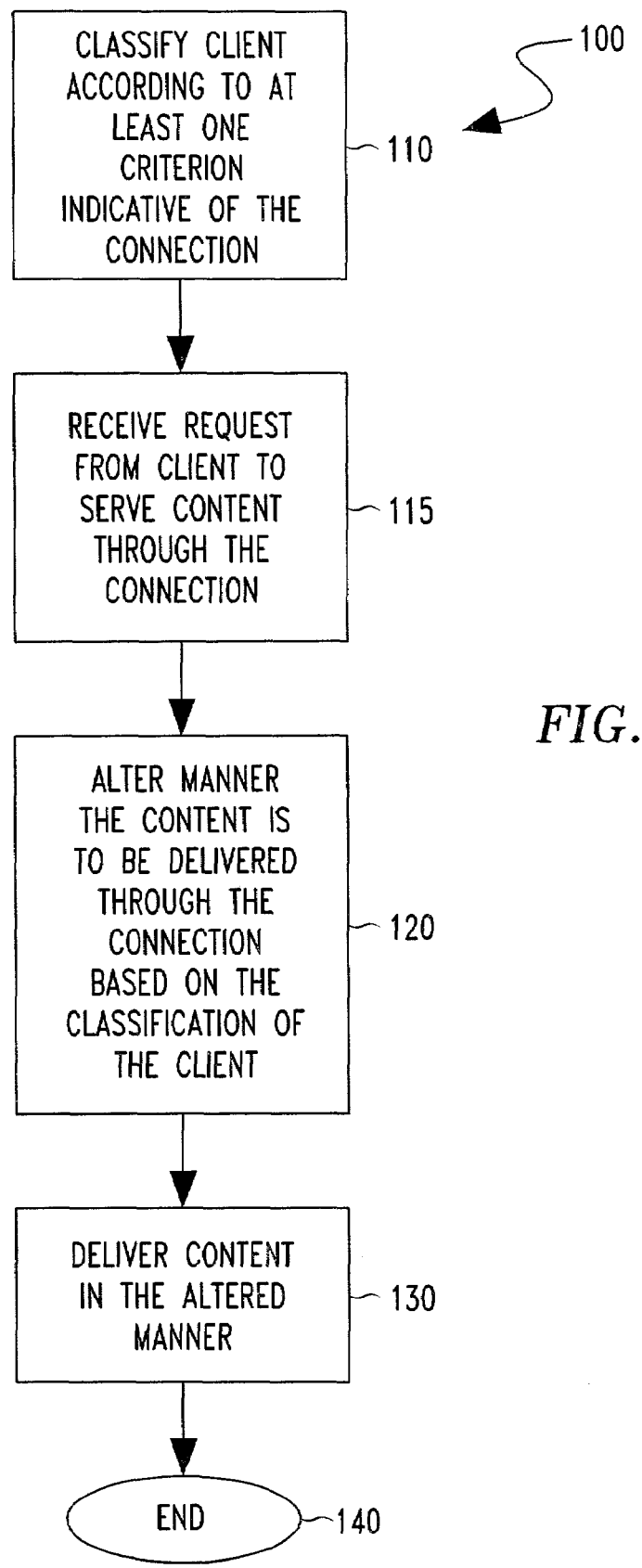
FIG. 1 sets forth a method of delivering content to a client in accordance with one embodiment of the invention.

FIG. 1 shows a method 100 of the invention for improving Web performance perceived by a client that is connected to a server through a connection. In a preferred embodiment of the invention, the client is an Internet browser such as the well-known Microsoft Internet Explorer® or Netscape Navigator® browsers, and the connection is a TCP/IP connection using the Internet.

The server initially classifies the client (step 110) according to at least one criterion indicative of the connection. As described in greater detail below, the client may be classified according to a number of criteria that indicate the quality and speed of the connection. Those criteria differ in how well they measure various aspects of the connection.

The server receives (step 115) a request from the client to serve content through the connection. The request may be received from a client that is already classified, or may be received from a client never before encountered. The classifying step 110 and the receiving step 115 may therefore be performed in any order.

Once a classification has been determined for a client, the server alters (step 120) the manner in which the content is to be delivered in accordance with the classification of the client. By altering the manner in which the content is delivered, performance of the server is improved without necessarily degrading the content delivered.

Once the manner of delivery has been altered, the content is delivered (step 130) in the altered manner, and the method is complete (step 140). A user perceives improved performance due to the altered delivery of the content. In a preferred embodiment, the content itself is not altered, so the user perceives no degradation in the quality of the delivered content.

Client Characterization

The first step in being able to adapt the manner of delivery of content for a client is to identify the client's characteristics. One approach is for clients to identify their characteristics themselves. Clients presently do this to a limited extent by specifying the content types they are willing to accept. In addition, clients could specify their network connectivity such as dial-up, cable modem, T-1, etc., as, for example, is done during set-up of a multimedia player. Clients may not, however, be relied upon to provide such information in normal Web browsing. In addition, a client's experience may vary depending on the time of day or the number of network hops between the client and the server.

It is therefore useful for a Web server to be able to characterize a client in the absence of explicit classification information from the client. There are a number of potential pieces of information available to a server for such classification. Three types of classification are discussed below based on network connectivity, response time and other considerations.

One characterization of a client is based on the nature of the network connectivity between the client and a server. Ideally, the server would have access to information about round-trip time (RTT), bandwidth, and the amount of congestion in the path to the client. In practice, however, the Web server can only make inferences based on the network traffic it receives from the client. For example, the server can estimate the RTT by measuring the time between accepting a TCP connection from a client and when the first byte of the subsequent HTTP request is received. That interval requires a single IP packet round trip. The approach is simple and introduces no additional network traffic, although typical Web servers would need to be instrumented to measure this value.

While each TCP connection made by a client to the server can be used to refine the RTT estimation for the client by the server, it is more difficult to estimate bandwidth characteristics for the network connection. Tools that estimate bandwidth between two nodes typically work by sending packets of different sizes between the nodes and measuring the respective round trip times. That approach adds overhead for both the Web server and the client.

Another approach that a Web server may use to estimate the RTT at the HTTP-level is to initially respond to a client request with a HTTP redirect response (302), which would typically cause the client to retrieve the redirected content. The difference between the two request times can then be used to estimate the RTT between successive HTTP requests. Unfortunately, that approach introduces an additional HTTP transaction and further lengthens the response time for the client.

One approach at the HTTP level utilizes the fact that, after loading the container object for a Web page, a browser typically automatically requests the set of embedded objects for the page. Measuring the time between the retrieval of the base object and the first requested embedded object may be used to estimate the time between successive HTTP requests without introducing additional requests. That technique obviates any need for redirection solely for the purpose of measuring.

Each of the previous measures seeks to characterize the RTT or bandwidth of the network connection between client and server. In an alternate approach to classifying a client, a server is not directly concerned with the nature of the network connection, but instead examines the response time seen by the client. This outcome-oriented characterization focuses less on the specific causes of poor performance and more on identifying the situations where it is occurring.

One approach for estimating response time for a Web page is to again use the fact that typically browsers automatically download embedded objects on a page. Using that observation, the measured time between retrieval of the base object and retrieval of the last embedded object on the Web page can be used as an estimate of the total download time for the page from the client. That measurement can be made without introducing any additional Web traffic.

A more accurate estimate of the total delay experienced by the client (vs. the server) can be done by instrumenting a page with an executable such as a Javascript applet, which executes within the client's browser, to measure the total download time and report it back to the Web server. Unfortunately that approach requires explicit instrumentation of pages and introduces additional HTTP traffic combined with the requirement that browsers accept executables. The Web server can also measure the number of connection aborts and resets from the client, which may suggest the presence of poorly connected, impatient clients.

There are several other factors that could be used in classifying a client. Information in the client request header such as accepted content types, the HTTP protocol version, and the client software itself could all be exploited in classifying the capabilities of the client. Once a client has been classified, the classification could be stored in cookies generated by a server and included by the client in subsequent requests.

Browser or proxy caching can also affect the classification of a client. For example, if a client requests only a few of the embedded objects on a Web page that is known to have tens of embedded objects, then the inference is that the client or an intervening proxy has many of the objects cached. Clients with or behind an effective cache may be considered richer while clients with no observable cache can be considered relatively poorer. On the other hand, a proxy in the path may introduce additional delay for requests from a client to the Web server and make that client appear poorer.

Another consideration in classifying clients is identifying which clients to classify. The most obvious candidates for classification are those for whom response time is important—users employing browsers. In contrast, automated clients such as spiders should be filtered out and not be considered for classification.

Potential Server Actions

There are a number of potential actions that a server could take after characterizing a client. The present invention focuses on those actions that alter the manner in which the content is delivered, which are primarily applicable to poor clients. Altering how content is delivered allows improvement in Web performance without compromising content. In deciding which action to take, a server may use characteristics of an individual client, or the server may consider characteristics of a client group, such as those formed by network-aware clusters.

Sites that use Content Distribution Networks (CDNs), may have some resources delivered from mirror sites distributed on the Internet. Often the choice of a particular mirror site is left to the CDN; however, the origin server can provide hints about the client's connectivity which can be factored in by the CDN in selecting the mirror. In that way, a mirror may be selected that is closer to a poorly connected client, or that is better connected to a client compared to the origin server.

In another embodiment of the invention, meta-information delivered with the content is altered to improve delivery performance. Well-connected clients and proxies are more likely to prefetch or prevalidate documents to lower user-perceived latency. The heuristic assignment of expiration meta-information to resources can be tailored by servers to ensure that poorly connected clients can avoid needless validation of less-frequently changing resources. In that embodiment, origin servers issue "hints," or non-mandatory instructions, via headers so that proxies between poorly connected clients and the origin server can increase the freshness interval for resources. By providing information to caches along the path, the origin server can help guide cache policies at the intermediaries.

Hints can also be provided by the server about request patterns of resources. Grouping resources into volumes and tailoring them to suit the client's interests can effectively provide useful information. In accordance with the present invention, a client classification may be used by the server as an additional factor in deciding the set of hints to be delivered to the client. A richly connected client might receive an extended set of hints while a poorly connected client might receive a more suitably tailored set of hints or no hints at all.

A server may continue to use connectivity information to improve perceived Web performance after it has returned a response. In HTTP/1.1, connections between a client and a server can persist beyond a single request-response exchange. The HTTP protocol does not offer any guidelines on deciding when a persistent connection should be closed. A server can decide when to close a persistent connection based on a variety of factors such as fairness, potential of future connections from the same client, duration for which a connection was already open, etc. If a server knows that a client has poor connectivity, it may keep the connection open longer than usual to ensure that the client does not pay the overhead of having to tear the connection down and set up a new one. A richly connected client could afford the overhead of setting up a new connection. Additionally, the server can assign a higher priority to poorly connected clients so that their requests are handled faster to reduce overall latency.

Another alternative is for the server to bundle the container document with some or all the embedded objects into a single resource variant and send it to avoid multiple rounds of requests to fetch the embedded objects. While that approach results in fewer requests by the client, the initial response is larger and the user must wait for a larger initial container document to load.

In each of the above embodiments, the manner in which the content is delivered is altered in accordance with the classification of the client. The content itself may also be altered to further improve performance, although a balance must be struck between perceived Web performance and the quality of the delivered content. A server could choose a larger and potentially enhanced variant of the content for delivery to rich clients, and a reduced version for poorer clients. Further, the response can be compressed with a suitable compression algorithm that takes into account the connectivity information. Again, the quality of the delivered content is affected.

A mirror or replica site may be utilized to improve delivery of content. The first action a server performs when it receives a request is to decide if the request will be handled on the machine where the request arrived. Often, busy Web sites have a large collection of machines behind switches or redirectors where the content may be stored or generated. For example, popular search engines and other busy news sites use that approach. The front-end server can use a client's connectivity information to guide selection of the back-end machine if the content stored or generated in those machines is partitioned on that basis. After choosing the proper mirror, the manner in which the Request-URI is mapped to a specific resource can be additionally tailored based on the client's connectivity.

Study Methodology

Rather than instrument a Web server to characterize clients and evaluate the potential of taking different actions, the inventors have taken an initial approach of analyzing the logs from a variety of Web server sites. By using logs for the analysis, the inventors have examined a wider variety of sites than possible if server instrumentation were required. The inventors have taken advantage of the fact that client browsers are typically configured to automatically download embedded objects for a container page. The delays between when the container page and subsequent embedded objects are served can thereby be used as a measure of the connectivity between a client and the server.

A heterogeneous collection of recent server logs was collected ranging in duration and number of accesses. The data includes logs from a university department, a specialized medical site, a large commercial company, a research organization, and a sporting site mirrored in multiple countries. It is important to note that the methodology is not tied to the choice of logs on which the experiments were carried out.

Not all of the logs used were in the same format, but all of the logs contained the following fields for each logged request: the requesting client (identified by IP address or string representation), the Request-URI, the response code, the date and time when the request was completed, and the response size. In addition, some of the logs also contained referrer and agent fields, which specify the URI that referred the current request and the agent software that made the request.

The analysis began by using the Request-URI to identify requests indicating an HTML object or the output of a server-side script. Those requests were marked as container documents, and the number of requests was counted for each of them. The set of pages accounting for 70% of accesses within the log was then determined to constitute the popular set of pages at that site. Further analysis only focused on those pages since the benefits for the invention are most likely to be applied to the most popular pages.

After preprocessing the log to identify the popular set of pages, the inventors focused on using requests with 200 OK or 304 Not Modified HTTP response codes in the logs to identify sequences of requests. A sequence is intended to correspond to a Web page and its associated set of embedded objects. A sequence is defined as a set of consecutive requests for a base object and at least one embedded object from the same client with the following characteristics:

1. The first (base) request in the sequence returns HTML content based on Request-URI indicating an HTML object or the output of a server-side script.

2. Each subsequent request in the sequence indicates the Request-URI is for an image, style sheet or Javascript object.

3. If the referrer field is available in the log then the referrer field for the embedded objects must also match the URI of the base object. This additional check does help to eliminate a relatively small number of sequences where the embedded objects did not match with the base object.

4. Finally, an arbitrary maximum threshold of 60 seconds was set between any object and the time the base object is downloaded. Any sequence that spans this duration is already going to be classified as poor and making the threshold larger increases the possibility of putting "stray" requests within the same sequence.

Figures 2, 3:
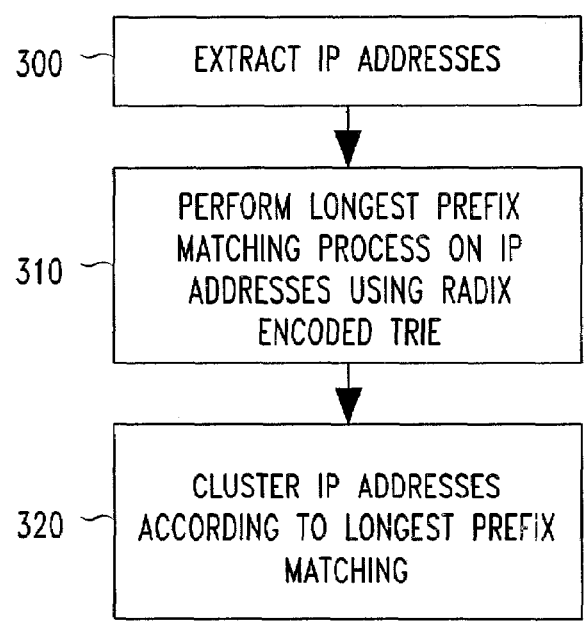
FIG. 2 is a table showing characteristics of a base object and several embedded objects retrieved in a sample sequence.
FIG. 3 is a flowchart representing an exemplary method for network aware clustering in accordance with one embodiment of the present invention.

That analysis does not guarantee obtaining all sequences of a base page followed by its set of embedded objects. For example, it will not work for pages with embedded HTML frames. However, it is not critical that all sequences be identified, merely enough to characterize clients. The analysis produces sequences such as the sample shown in FIG. 2. The table 200 shows that the retrieval 210 of a base object of 12221 bytes is followed by the retrieval of 10 embedded objects over the course of 28 seconds. Two of the requests 220, 230 resulted in a response code of 304 for which no content bytes were returned. While a finer granularity than one second would be preferable, this coarse granularity does provide enough information to identify the relative duration of a sequence, which is a focus of the invention.

A benefit of focusing on clients that download the embedded objects on a page is that such a focus typically filters out spiders. As an additional check, if the agent field is available, all identifiable spider requests are removed; however, subsequent analysis shows that that additional filtering has little effect on the number of sequences identified in a log.

As an additional analysis tool, the set of unique IP addresses in each log was clustered using the technique for on-line network-aware clustering outlined in commonly assigned U.S. patent application Ser. No. 09/705,675, filed Nov. 3, 2000 and entitled "Method for Fast Network Aware Clustering," the contents of which are hereby incorporated by reference in their entirety herein. In that technique, shown in FIG. 3, a plurality of client IP addresses are extracted, step 300. Longest prefix matching is then performed on each client IP address according to a data structure or radix-encoded trie, step 310. Once longest prefix matching is performed on each client IP address, all the client IP addresses that have the same longest matched prefix are classified or grouped into one client cluster, step 320. In that embodiment, to cluster a set of IP addresses in an on-line network-aware manner, a recursively structured table or data structure, called a radix-encoded trie or retrie, is used.

As used herein, the radix-encoded trie or retrie is basically a table indexed on some high-order bits of a given key. Each entry points to another table, indexed by some of the following bits, and so on. For background purposes, an IP address is, e.g., in IP v.4, a 32-bit integer. An IP prefix, p, is an IP address associated with a length $l(p) \in [0,32]$. Prefix P matches address A if A & $((2^{l(P)}-1)<<(32-l(p)))$=P, where & is a bit-wise AND and << is left shift. Thus, given a collection of K-bit keys, consider a top-level retrie, R, indexed on the k most significant bits of a key. R is a table of size $2^k$, Let >> indicate right shift. Given a key x, element R[x>>(K-k)] points to a second-level retrie R', indexed on, say, the next l bits. The element of R' corresponding to x is R'[(x>>(K-(k+l))) & $(2^l-1)$]; and so on. That is, each retrie has a shift value (K-k in the top level, K-(k+l) in the second level of this example) and a mask value ($2^k-1$ in the top level, $2^l-1$ in the second level); the top-level mask is superfluous. The shift and corresponding mask values among the lower-level retries need not be identical.

As used herein, the retrie may be completely described by a structure containing pointers to the top-level table and shift and mask values. Standard memory alignment of pointers may be used to search for key x in retrie r follows:

while(!((r=r->table[(x>>r->shift)&r->mask])&1))

When the loop exits, the upper 31 bits of r point to the data record for x.

To build a retrie for a set S of IP prefixes, a binary search tree T describing the induced address ranges is first built. Consider prefix $p=b_1 \ldots b_{32}$, where the $b_i$'s are the bits of p in msb-to-lsb order, and define the addresses $$low(p) = b_1 \cdots b_{l(p)} \underbrace{0 \cdots 0}_{32-l(p)}$$

and $$high(p) = b_1 \cdots b_{l(p)} \underbrace{1 \cdots 1}_{32-l(p)}.$$

Prefix p covers addresses in the range [low(p), high(p)].

Initially, T contains one key, 0, describing the range $[0, 2^{32}-1]$. We insert each prefix p in S, in non-decreasing order by length, into T as follows. Find the predecessor, x, of p in T. By induction, the properties of prefixes and the ordering of prefixes by length imply that the range of p is contained in the range [x,y), associated by invariant with x, where y is the successor of x in T. Insert low(p) and high(p)+1 into T, associating range [low(p), high(p)] with low(p). The remainder of the original range, [x,y), associated with x, is split into ranges [x, low(p)), associated with x, and [high(p)+1, y), associated with high(p)+1. After construction, an LPM query on an address x could be performed by a predecessor query of x in T.

Consider a retrie to be built on some range R=[x,y) (initially $[0, \infty)$) of addresses, and assume a global threshold parameter t. The elements of T within R correspond to the matching prefixes within R. The shift value s and mask value m are in 1-to-1 correspondence. Let L be the length of the longest prefix within R. Ideally, s is set so that 32-s=L; i.e., so that the retrie fully qualifies each prefix within R. If the corresponding m exceeds 2'-1, however—if the table would be too big—, then m is set to 2'−1 and s is set accordingly, resulting in lower level retries. The table is then populated using elements of T to map IP addresses to corresponding LPMs, recursively constructing lower level retries as necessary. Another global parameter k determines that the top-level mask is always $2^k-1$.

Figure 4:
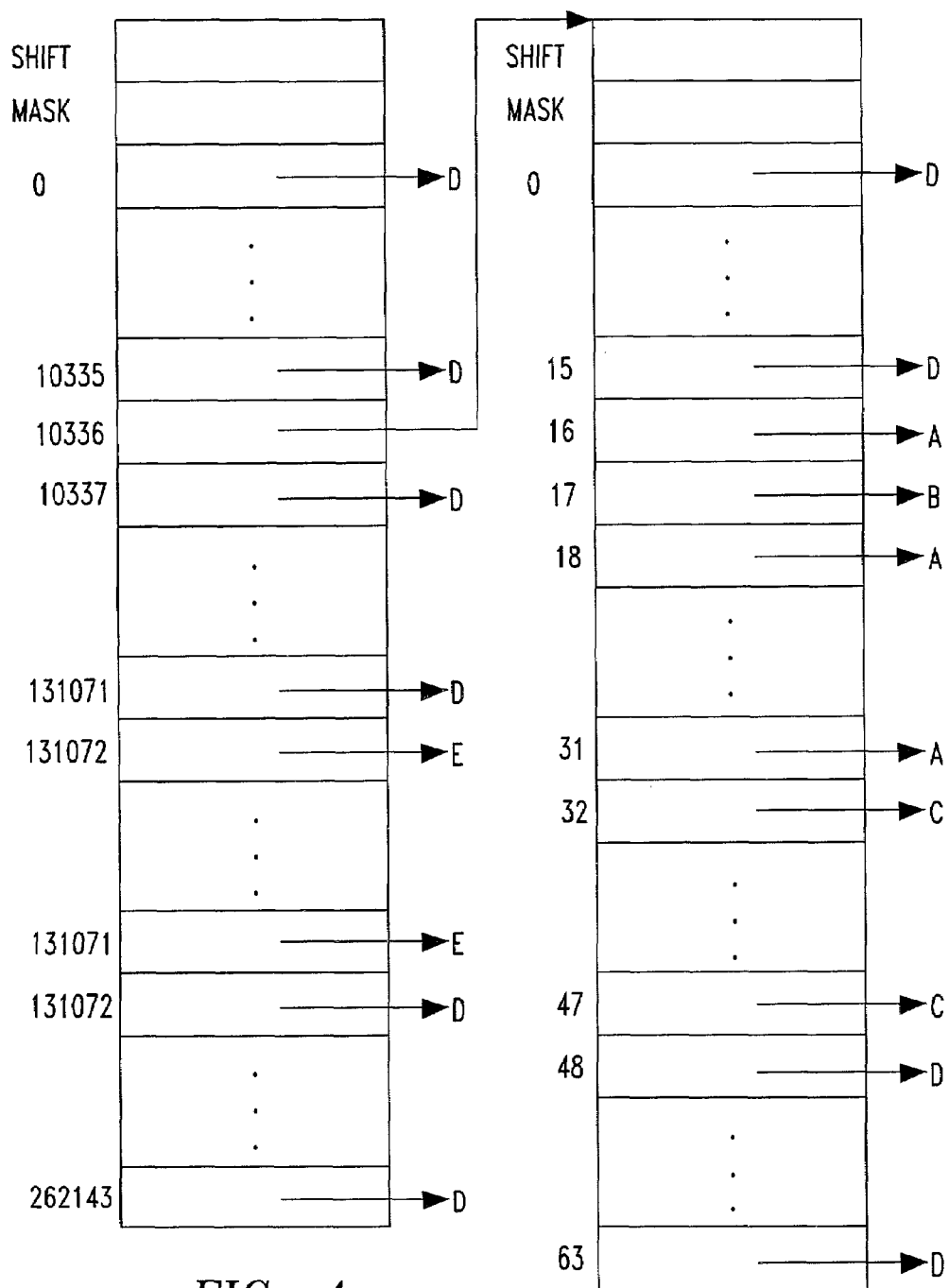
FIG. 4 is an exemplary radix-encoded trie structure in accordance with one embodiment of the present invention.

Referring to FIG. 4, given prefixes 10.24.16.0/20 (A), 10.24.17.0/24 (B), 10.24.32.0/20 (C), 128.0.0.0/4 (E) and 0.0.0.0/0 (D). The top portion of FIG. 4 shows partition of 32-bit address space induced by the prefixes. For example, B is an extension of A, which partitions A's range, [10.24.16.0, 10.24.31.255], into subranges [10.24.16.0, 10.24.16.255], [10.24.17.0, 10.24.17.255] and [10.24.18.0, 10.24.31.255], associated with A, B and C, respectively. The bottom portion of FIG. 4 shows the radix-encoded trie of the present invention. First level has 18-bit mask, and second has 6-bit mask to qualify prefixes A, B and C fully. Masks and table indices are in decimal. For example, to search for x=10.24.19.45, we index (x>>14) & 262143=10336 in the top-level retrie, leading to the second level, which we index by (x>>8) & 63=19, yielding LPM A.

Referring again to FIG. 4, the <shift, mask> values are combined into a single value in the predecessor table which cuts the number of memory accesses in half. An exemplary code implementation of the retrie is further provided in FIG. 5a. In that embodiment, the elements in the last retrie table level contain only the next hop index which decreases the retrie table size, as is shown where the number of retrie levels is fixed; e.g., FIG. 5b provides exemplary code, pmatch20, for a 2-level retrie.

Using that technique, network information available from BGP (border gateway protocol) snapshots is used to identify client clusters. Clustering was carried out by a small C program that uses a fast longest prefix matching library. The software is capable of clustering millions of IP addresses using a large collection of BGP prefixes (over 441K unique prefixes) in a few seconds. In cases where the logs recorded domain names versus IP addresses, a DNS lookup was performed on each name prior to clustering. In cases where the DNS lookup failed or the clustering technique was unable to cluster a client with other clients, that client was treated as its own cluster for subsequent analysis.

Once the set of sequences were identified in a log, the characteristics of the sequences for a client were used to characterize that client. The present embodiment utilizes three simple categories for characterizing a client: poor, normal and rich. The term "poor" is used to refer to clients that generally exhibit long delays between retrieval of the base object and subsequent embedded objects. In contrast, the term "rich" is used to refer to clients that consistently exhibit little delay between retrieval of the base object and subsequent embedded objects. The term "normal" is used to refer to clients that cannot be classified as either poor or rich.

Figures 6, 7:
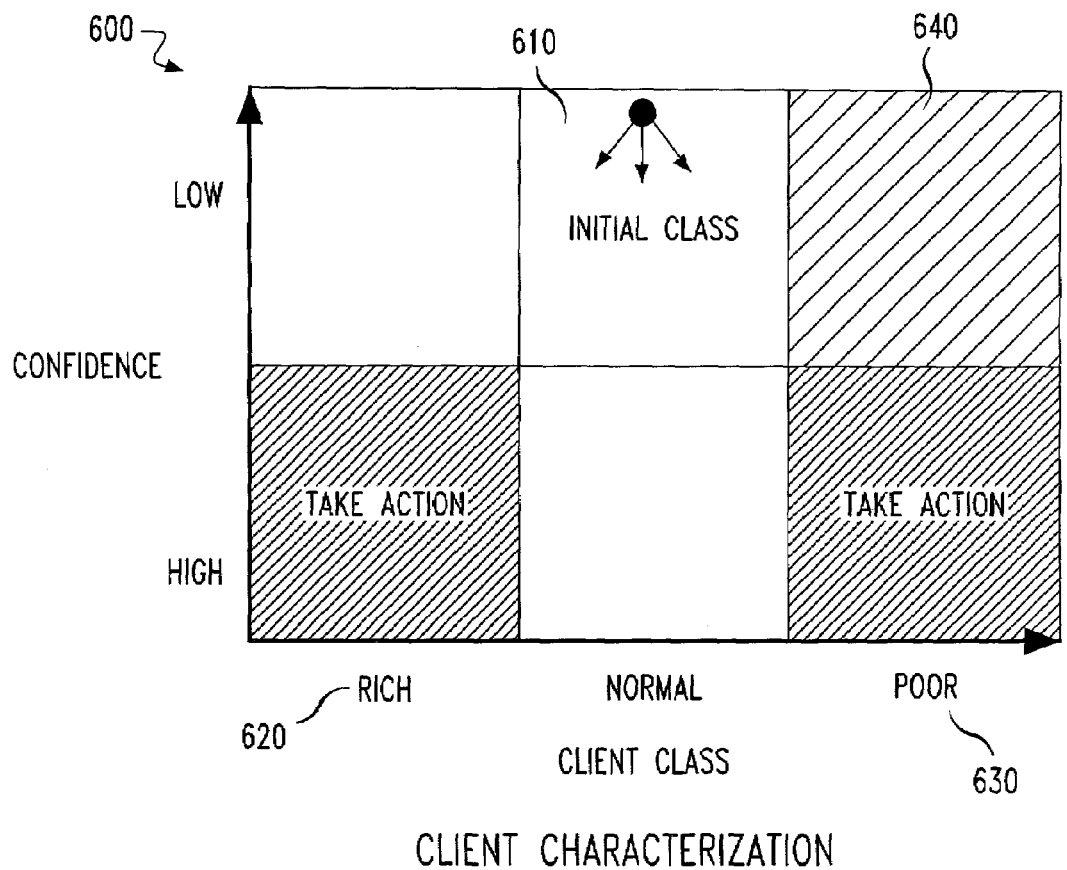
FIG. 6 is a graph showing a system of client characterization according to one embodiment of the invention
FIG. 7 is a table showing parameter policies in accordance with embodiments of the invention.

FIG. 6 depicts a conceptual picture 600 of how an individual client is classified. As shown in region 610, all clients are initially classified as normal with a low level of confidence for such a classification. As sequences of requests are handled for that client, the performance of those sequences may fall below a threshold of acceptable performance and cause that client to be reclassified as poor 630. Alternately, the sequence performance may consistently be above a threshold of good performance and cause that client to be reclassified as rich 620. At some point, the server receiving a client's requests reaches a high enough level of confidence that the server may take one of the actions discussed above in serving the requested content. The lighter shading 640 in upper-right portion of FIG. 6 indicates that a server may be willing to take action more aggressively, even in the case of low confidence, if it classifies the client as poor. A server may be justified in pursuing this course because failure to do so may result in the client leaving the site rather than requesting additional content.

It is also desirable to measure the success of policies that classify clients and take corresponding actions. In an ideal world, a server knows when the performance of serving a sequence is going to be poor and takes some action to improve the performance. A server also preferably knows if the performance of serving a sequence is going to be good, which would potentially allow it enhance the content it might serve to the client. Using those ideals as a starting point, the performance of a client classification policy is defined as good if a high percentage of bad accesses in a log are done by clients classified as poor and a high percentage of good accesses in a log are done by clients classified as rich. The higher those percentages, the more possibilities for the server to take action, although the aggressiveness of the classification must also be tempered by potential negative effects of incorrect classification. For example, serving enhanced content to a client classified as rich, who is actually not rich, may lead to negative consequences. In analyzing various classification policies, the inventors examined the tradeoffs between more and less aggressive classification policies.

Given this conceptual picture and a means for measuring success, policies and thresholds for characterizing clients represented in each log are defined. Two metrics are used in classifying a client: the delay between the base object and the first embedded object in a sequence and the delay between the base object and the last embedded object in a sequence. The first metric is desirable because it measures the time for a client to receive at least part of the base object and parse it for embedded objects, and for the server to receive and process the request for the first subsequent object. The second metric is desirable because it corresponds to how long a client must wait for all of the embedded objects for a page to be downloaded. While that value will vary according to the size and number of objects, it is a reasonable measure in identifying sequences with unacceptable delays.

For each of those two metrics, cumulative values $E_{first}$ and $E_{last}$ are defined to represent long-term estimates for these two metrics for each client. While simple cumulative values such as minimum, maximum and mean could have been used, a preferred embodiment of the invention seeks to both minimize the amount of information stored for each client and to give greater weight to more recent history. That embodiment utilizes a smoothed mean where the value for $E_{first}$ ($E_{last}$ is similarly defined) is given as:

$$E_{first}=\alpha E_{first}+(1-\alpha)E_{measured}$$

where $E_{measured}$ is the current measurement for the delay between the base and first embedded object. The value α is called the smoothing factor and takes on values between zero and one. In the following discussion, three values of α are considered: 0.0, 0.3 and 0.7. Note that in the case where α=0.0 only the last measurement is used in classifying the client.

Using those defined values for $E_{first}$ and $E_{last}$, thresholds are defined for identifying poor and rich clients. The inventors use published examples of thresholds as guidelines in identifying three sets of thresholds for the definition of a client experiencing poor performance (all times in seconds):

if $E_{first}$>3 or $E_{last}$>5 if $E_{first}$>5 or $E_{last}$>8 if $E_{first}$>6 or $E_{last}$>12

Only one threshold set is defined for a client experiencing good performance and hence warranting classification as a rich client:

if $E_{first}$>1 or $E_{last}$>2.

Those thresholds define the categories rich 620 and poor 630 shown in FIG. 6. Two levels of confidence are considered with each policy. The first confidence level is more aggressive in allowing clients to be classified as rich or poor after the first sequence is processed for a client. The second confidence level is more conservative in keeping the classification of a client as normal until at least six sequences are processed from a client.

In a preferred embodiment, the invention utilizes client clustering to improve performance. A cluster is characterized as poor, rich or normal by using accesses from all clients within a cluster. In cases where an initial sequence is requested by a client, the default is to always classify that client as normal. However, in cases where an initial sequence is requested by a client that is part of a cluster, then the current classification for that cluster is assigned as the initial client classification.

It is recognized that a busy Web server cannot realistically store state about clients over a long period of time. Instead, garbage collection is used to remove the state and classification for clients when the last page access is more than one day old in the logs.

As part of their study, the inventors have tracked the identity of clients that can benefit from the analysis. The inventors estimated a percentage of clients that are stable; i.e., either never or rarely move between the categories. The more stable a client, the more likely is it that a server can take tailored action. Unstable clients are not good candidates for server actions.

Table 700 (FIG. 7) shows the ranges of parameters described above for the various classification policies studied. 36 combinations are defined by the values of table 700.

In addition to using the Web server logs to classify clients, the inventors have also used the logs to identify poor performing sequences and to determine which of the above-identified actions could be applied to those sequences. In accordance with the invention, a variety of considerations are taken into account by a server before deciding on the applicability of a particular action to a sequence. Among those considerations are the length of the sequence (for example, certain sequences must be long before it is considered useful to trigger a particular server action), the size of the full container document and the size of the base page. Table 800 (FIG. 8) lists a series of possible server actions and the sequence criteria examined for each action.

Redirecting the client to a mirror through HTTP or DNS redirection (row 805 of table 800) can be applied to any page, but is most effective relative to other server actions when the long sequence is due to a long RTT between client and server. All sequences with a large delay for the first object are therefore flagged.

Altering meta-information (row 810) can be used to extend the freshness interval of a page or to utilize piggyback cache validations to reduce the number of unnecessary 304 responses. Piggyback cache validation is a process whereby, in its simplest form, whenever a proxy cache has a reason to communicate with a server, it piggybacks a list of cached, but potentially stale, resources from that server for validation. Cache coherency is thereby maintained at a reduced traffic cost to the system. That technique is more fully described in Balachander Krishnamurthy and Craig E. Wills, Study of Piggyback Cache Validation for Proxy Caches in the World Wide Web (USENIX Symposium on Internet Technologies and Systems, December, 1997), the contents of which is incorporated herein in its entirety. The potential applicability of altering meta-information is measured by determining the number of poor performing sequences that contain at least one 304 response.

In the case of long sequences, content delivery may improved by using longer persistent connections (row 815) or increased scheduling priority for a particular client at the server. Other techniques such as the bundling of content may also be used.

The amount of content to be transmitted may be reduced by compressing it (row 820). The applicability of that technique is determined by measuring the number of poor performing sequences having a large number of bytes. Finally, the amount of content in a given page may be reduced by simply transmitting a simplified or scaled-down version of the page (row 825). Content reduction and some forms of compression may not, however, be satisfactory solutions because the quality of the user experience is adversely affected by reducing the amount of content transmitted.

To study the client characterization policies and applicability of server actions, the inventors collected a heterogeneous set of recent server logs from eight different Web server sites. Descriptions for those sites are as follows:

largesite.com—an anonymous large commercial Web site,
research.com—a Web site for an anonymous commercial research organization,
wpi.edu—an educational Web site for the WPI campus,
cs.wpi.edu—a Web site for the WPI Computer Science Department,
bonetumor.org—a medical Web site devoted to bone tumors, and
cricinfo.org—a sports site devoted to cricket with logs from three mirror sites in Australia, U.K., and the U.S.A.

Figure 9:
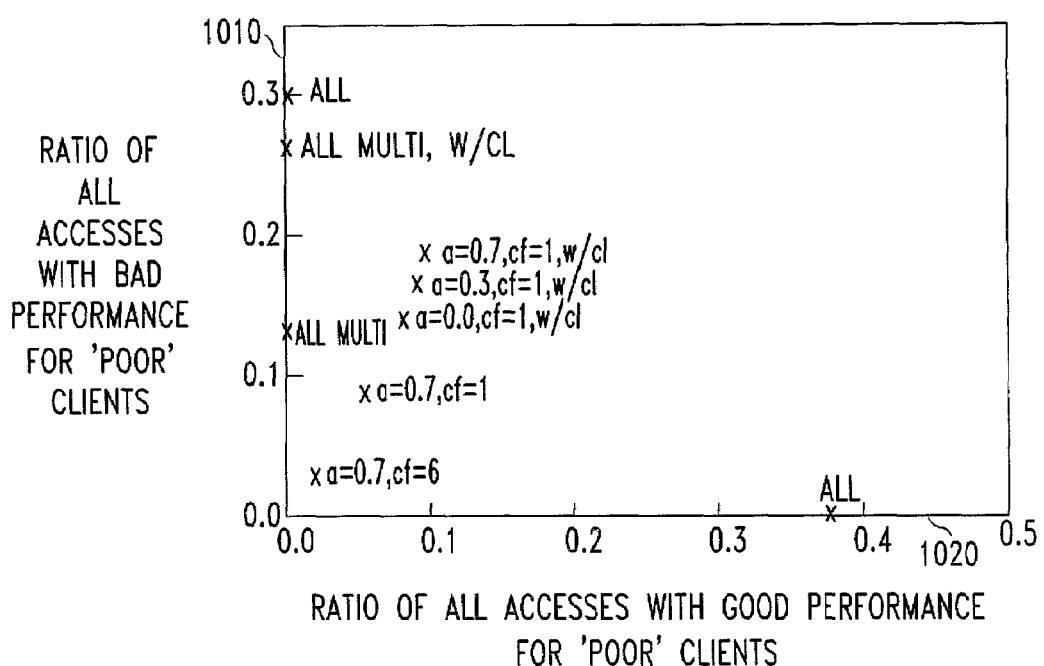
FIG. 9 is a table of statistics about sample Web site logs used in a study by the inventors.

All logs are from the April-October, 2001 time frame except for the cricinfo.org logs, which are from June, 2000. Table 900 (FIG. 9) shows the duration and number of requests for each log, along with the number of sequences identified using the methodology described above. The last column in the table indicates whether both the Referrer and Agent fields are available for each log entry. It is important to note that additional sets of logs were available for the sites for similar durations. Although only one set is shown here, other sets were analyzed and the results were similar across the board.

The client characterization policies described above were studied using the logs. The discussion contained in this disclosure focuses on particular policy parameters and logs for clarity. For example, all results shown use the threshold of (5,8) (the thresholds of $E_{first}>5$ seconds or $E_{last}>8$ seconds) as a definition of a poor performing sequence. Using thresholds of (3,5) and (8,12) changes the number of poor performing sequences identified in each log, but does not change the relative performance of the policies. Variations among other parameters and logs are noted as appropriate.

In studying the characterization of poor clients, a metric is first defined to measure the success of a classification policy. One such metric is to focus on the sequence accesses with "bad" performance. Consistent with the definition of $E_{last}$, it is assumed that a bad performing sequence is one where the delay for the last embedded object is greater than 8 seconds. Ideally, all accesses with bad performance should come from a client that has been characterized as poor. In those cases, the server could take a mitigating action to improve the performance in serving the given sequence of objects or alter the content served. Similarly, an access with good performance from a client characterized as poor could mean the server has taken some action, such as altering the page content, when in fact poor performance did not result. It is assumed in this discussion that an access with good performance shows a last embedded object delay of no more than 2 seconds.

The observations imply that the best policy for characterizing clients maximizes the number of bad accesses associated with poor clients while minimizing the number of good accesses by those clients. The inventors have reviewed the range of policies summarized by the parameters of table 700 (FIG. 7) for the largesite.com logs, and have shown those policies as labeled interior points in the chart 1000 (FIG. 10). The labeled points on the axes define the best and worst cases resulting from any client characterization policy.

The y-axis 1010 of the graph shows the ratio of all sequence accesses in the log that have a "bad" last embedded object delay time greater than 8 seconds. The "All" point on the y-axis shows that 30.5% of all sequence accesses in these largesite.com logs have this property. The x-axis 1020 of the graph shows the ratio of all sequence accesses that have a "good" last embedded delay less than or equal to 2 seconds. The "All" point on the x-axis shows that 38.3% of all sequence accesses in these largesite.com logs have this property.

Intuitively, the best policy is the one closest to the upper left of chart 1000 of FIG. 10. Unfortunately it is difficult to classify clients until at least one sequence has been accessed by a client. The "AllMulti" point in the figure shows that only 13.6% of all accesses are both bad and come from a client that has requested multiple sequences. As shown by the "AllMulti+clusters" point, this value is raised to 26.5% if we consider all bad accesses that come from a client that has previously requested one sequence or is in a cluster for which another client in the cluster has previously requested a sequence. The difference between these two values shows that client clustering has a significant effect on the ability to characterize clients in this log.

The interior points of chart 1000 represent results for particular policy parameters. The "$\alpha=0.7$, cf=6" point in the lower left corner is a relatively conservative classification policy because it requires at least 6 sequence accesses from a client before it is willing to classify the client as either poor or rich. Using this policy only 3.4% of all bad accesses come from a client classified as poor while 2.1% of all good accesses come from such clients. The "$\alpha=0.7$, cf=1" policy can classify a client as soon as one access from the client has been made. Using this policy, only 9.3% of all bad accesses come from a client classified as poor while 5.7% of all good accesses come from such clients. Other $\alpha$ values for these confidence levels show similar results and are omitted from the graph for clarity.

The remaining three points on chart 1000 of FIG. 10 show results where the characterization for all clients within a cluster is used to initialize the classification for any previously unseen client within a cluster. Results for all values of $\alpha$ with a confidence level of one access needed for classification are shown. Those results show a much higher level of bad accesses that are made by clients classified as poor, but also an increase in the number of good accesses by that set of clients. Using $\alpha=0.7$, 19.1% of all accesses show the delay for the last embedded object to be greater than 8 seconds with these accesses done by a client characterized as poor. In those cases the server could potentially take some action to reduce that time. On the other hand, using the same $\alpha$ value, 8.3% of all accesses with a delay of less than or two seconds for the last embedded object were made by a client classified as poor.

The results of using different policy parameters shown in chart 1000 demonstrate that a range of tradeoffs exist. The correct tradeoff depends on what is important to the Web site and what are the negative implications of an incorrect classification. If a site would like to retain clients that have poor connectivity to the server then the site might be more aggressive in classifying clients, particularly if the actions taken do not have an overtly negative effect on a client that might be misclassified. Otherwise, a more conservative policy should be considered. However, if the policy is so conservative that it classifies relatively few clients then the idea of client classification may not be useful at all for the site.

The results shown in chart 1000 of FIG. 10 indicate that basing initial classification decisions on accesses from across a cluster of clients is worthwhile. More accesses with bad performance are associated with clients classified as poor while the ratio of bad to good performing sequences is about the same, or a bit better, than when clustering is not used.

The chart 1000 shows results for various policy parameters for a single log. In contrast, table 1100 of FIG. 11 shows results for all logs for the policy parameter combination of $\alpha=0.7$ and a required confidence level of one access. The results shown in the table correspond to those shown in the figure. The second column 1110 is the percentage of all bad performing sequence accesses in a given log that show a delay of more than 8 seconds for the last embedded object. That value ranges from 9.2% in the cs.wpi.edu log to 38.5% in the USA cricinfo.org log. The third column 1120 is the percentage of total accesses that are bad performing accesses from a client with multiple accesses. That value ranges from 3.8% for the cs.wpi.edu log to 29.7% in the Australian cricinfo.org logs.

The fourth column 1130 of table 1100 is a percentage of accesses with bad performance from clients classified as poor with the relative percentage of all accesses with bad performance in parentheses. Over 50% of all accesses with bad performance are from poor clients in the cricinfo.org logs, but those percentages are lower for the other logs. The research.com, wpi.edu and cs.wpi.edu logs have lower percentages because relatively few clients in those logs show consistently poor performance to be classified as poor. The largesite.com and bonetumor.org logs have lower percentages because there is a large difference between the second and third column of table 1100. The third column is the effective performance limit so any policy for those logs will not perform well if a policy decision cannot be made until after at least the first access by a client.

One approach for alleviating this problem is to consider the use of cluster information. The next two columns 1140, 1150 in table 1100 repeat the previous two columns except use available information about a client's cluster in making initial classification decisions. The results for the largesite.com results show the most improvement relative to not using client clustering. Many of the relative performance results in the sixth column 1150 are in the 60-70% range indicating that a server could take corrective action for a majority of badly performing client accesses. The research.com, wpi.edu and cs.wpi.edu sites generally have clients that are better connected to the sites (many on-site users for the wpi logs) so classification of poor clients is expected to be less successful.

The last column 1160 in table 1100 reflects the potential negative effect of making an incorrect client classification. That column shows the percentage of all good performing sequence accesses by a client classified as poor. The relative percentage of those accesses compared to all good performing accesses (not shown in the table) is given in parentheses. The results show up to 10% of all accesses fall in this category for some logs with relative percentages up to 35%.

As a contrast to characterizing poor clients, table 1200 of FIG. 12 shows results for characterizing rich clients for all logs with a policy parameter combination of $\alpha=0.7$ and a needed confidence level of 6 accesses. A higher level of confidence is expected to classify a client as rich because a likely server action to take in that case is serving enhanced content to the user. Doing so for a client incorrectly classified as rich could have serious negative effects for the client.

The meaning of results shown in table 1200 mirror those shown in table 1100. The second column 1210 in the table shows the percentage of good sequences accesses with a total delay for the last embedded object of less than or equal to 2 seconds. The results show that the cs.wpi.edu and research.com logs have the highest percentages of good performing sequences with the cricinfo.org logs generally showing the worst performance. Subsequent columns and relative percentages show the percentage of good sequences for clients classified as rich—using and not using clusters. The last column 1260 of the table shows the percentage of bad performing accesses made by clients classified as rich. As desired, those percentages are relatively low, although there is also a much lower percentage of good accesses made by clients classified as good. The results reflect a more conservative classification policy for rich clients.

For a given policy, each client is initialized to the "normal" class unless access information is known for other clients within the same cluster in which case the client inherits the class of its cluster. Each client is potentially reclassified after each sequence access. For each policy, the number of clients in each class was counted at the end of processing each log. Classes were also tracked for clients that were inactive for over a day and whose state information was removed.

Table 1300 of FIG. 13 shows the percentage of distinct clients in each class for the largesite.com logs. The policy parameters of $\alpha=0.7$, cf=1 with clustering was used for those results. Clients are classified according to the number of sequence accesses they made in the log. Because client information is discarded after a day of inactivity, accesses from the same client separated by more than a day are classified as separate clients.

The results show that the vast majority of clients coming to this site access a relatively few number of pages containing embedded objects. Among all clients, about 75% remain classified as normal. About twice as many of the remaining clients are classified as poor compared to rich. As a contrast, using the same policy parameters for the research.com logs shows 78% of clients classified as normal, 18% as rich and the remaining 4% as poor. The difference simply reflects different characteristics among the set of clients visiting those respective sites.

The inventors also examined the client characterization policies for stability in terms of the frequency that the client class changed. It was found that 72.5% of the largesite.com clients stayed in their initialization class. In most cases, the client was initialized to normal and stayed in that class, but if cluster information was available then the client may have been initialized to the poor or rich class. For 18.6% of clients, there was at least one transition from the poor class to another class or from another class to the poor class. Given that 17.2% of all clients finished in the poor state (shown in table 1300), those results indicate that the classification is stable. In fact, only 1.2% of clients had more than two transitions into or out of the poor class. Similarly, 9.8% of clients had at least one transition into or out of the rich class. Given that 7.6% of all clients finished in the rich class, those results also indicate stability of the classification. Only 1.1% of clients had more than two transitions into or out of the rich class.

In addition to using the Web server logs to classify clients, the inventors also used the logs to identify sequences exhibiting bad performance and to determine which of the server actions could be applied to improve performance. For that portion of the study, the inventors analyzed the characteristics of all sequence accesses in which the delay for the last object retrieval was more than 8 seconds. The inventors sought to match the sequence characteristics identified for possible server actions in table 800 with the characteristics of accesses with bad performance in the set of logs. All such accesses were considered and the analysis was not limited to only those accesses from clients classified as poor.

The criteria to determine which sequences are appropriate for which server actions are not clear nor do the same criteria need to be applied at each site. For purposes of comparisons between different types of sites and different server actions, no common criterion is applied to all sites, but this approach is used only to understand the potential applicability of different server actions.

Table 1400 of FIG. 14 shows the percentage of sequences with bad performance for which each type of server action is applicable. Table 1100 gives results on the percentage of sequences with bad performance in each log.

First examined is the applicability of server actions that do not alter the contents of a page. The first of those actions is to redirect a client to a "closer" content provider, shown in column 1410. While that action could be applied to any sequence, the inventors focused on sequences where the delay to retrieve the first embedded object in the sequence is large. A large initial delay may indicate the effect of a big RTT between the client and server, which can be reduced if the client can retrieve the content from a site that is closer to it. For those results, a threshold of greater than 5 seconds was used because it is the corresponding threshold used in classifying poor clients. The values in the second column 1410 of Table 1400 show the percentage of all sequences with bad performance that have a delay for the first object greater than 5 seconds. The percentage of sequences is greater than 25% in all cases and shows the largest percentage across all potential server actions for the cricinfo.org logs.

Note the initial delay would not include time spent by a server to generate the content because the time stamp on the base object is the time in which its content is written to the client. It is possible that a large base page could cause a longer initial delay as the client has more bytes to receive and process before it can request subsequent objects. For example in the largesite.com logs, 37% of all sequences with bad performance had an first object delay greater than 5 seconds and a base page larger than 10K bytes.

Column 1420 of table 1400 (altering meta-information) indicates the percentage of sequences that include at least one 304 response. Those requests could be eliminated by increasing the freshness lifetime for objects or allowing clients to piggyback validation requests onto other requests. The results show that this approach could be of moderate usefulness, particularly for the wpi.edu and cricinfo.org logs.

It is difficult to apply a precise criterion for when compression (column 1430) is appropriate. We selected a value of 40K total bytes in a sequence as the threshold for a sequence with a large number of bytes. This is approximately the median value for total bytes in a sequence across all logs in our study. The medians for individual logs ranged from 15-65K bytes. The fourth column 1430 in the table shows the percentage of sequences with bad performance that have more than 40K total bytes. The bonetumor.org logs have the highest percentage of large sequences. All but the cricinfo.org logs have a significant number of sequences matching that criterion. A further distinction between text and image objects would likely improve those results because image data cannot be generally compressed as much.

Column 1440 of table 1400 identifies the percentages of sequences with bad performance sequences that have a long list of objects in the sequence. The handling of those long sequences can be altered by bundling objects together. Alternately, a server can improve the effectiveness of handling each request by extending the connection lifetime or giving higher schedule priority for these clients. Again, determining a specific threshold for a long sequence is difficult with the results shown in the table based on a threshold of 10 objects. That is approximately the median length of sequences with poor performance across all logs. The medians for individual logs are between 4 and 14. The results show the most applicability of this server action for the largesite.com and wpi.edu logs. The bonetumor.org logs have virtually no long sequences.

In contrast to actions that do not alter page contents, column 1450 in the table shows the percentage of sequences with bad performance that could be improved by serving an altered (by size and number of objects) Web page. That action could be applied to all sequences, but is most applicable to those with either a large number of objects or total bytes. As discussed above, by reducing the size and number of the delivered content, the quality perceived by the client is diminished. The percentages in the table are for all sequences with bad performance that have at least 10 objects or more than 40K total bytes. This action could be applied to the majority of sequences in all logs except for the cricinfo.org logs.

In summary, clients may be classified based on characteristics determined by a server and a range of server actions may be applied in the case of a client classified as poor. A relatively simple classification policy can correctly classify clients as poor so that the majority of sequences with bad performance come from these clients.

Client clustering improves in most logs and significantly improves in some logs the number of clients that can be initially classified based on cluster information. There are not only more classifications, but the accuracy of those classifications is comparable to when information for only a single client is used.

There are tradeoffs for the aggressiveness of client classification. The negative implications of a wrong classification should determine the aggressiveness of the policy to use. Classification also helps characterize rich clients, but the impact is reduced when these policies need to use a higher degree of confidence because the cost of serving enhanced content to a client incorrectly classified as rich is higher.

Client classification works best for sites with a variety of clients. Classification of poor clients does not work well when there are relatively small numbers of poor clients visiting the site. Client characterization is stable for particular clients with few transitions between classes observed beyond initial transitions for a client. No single type of server action is most applicable for all sites and each server action is applicable to a significant number of sequences with bad performance on at least one site.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method for delivering content to a first client through a first connection, the method comprising the steps of:

forming a group of clients including the first client by processing the IP addresses of the clients according to a radix encoded trie classification process;

classifying the group of clients into a group classification according to at least one criterion indicative of at least one connection through which content is delivered to at least one member of the group other than the first client including placing the group in one of a poor, a normal and a rich class;

receiving a request from the first client to serve content through the first connection;

altering a response to the client request in accordance with the group classification; and sending the response to the client.

2. The method as claimed in claim 1, wherein the step of altering the response comprises altering the content to be delivered.

3. The method as claimed in claim 1, wherein the step of altering the response comprises altering the manner in which the content is to be delivered.

4. The method as claimed in claim 3, wherein the step of altering the manner of delivery comprises redirecting the client to a mirror server.

5. The method as claimed in claim 3, wherein the step of altering the manner of delivery comprises altering meta-information delivered with the content.

6. The method as claimed in claim 5, wherein the step of altering meta-information results in extending a freshness lifetime of an object in the content.

7. The method as claimed in claim 5, wherein the step of altering meta-information results in altering a policy of including cache validation requests with other messages exchanged with a server.

8. The method as claimed in claim 3, wherein the step of altering the manner of delivery comprises increasing a length of allowed TCP sessions.

9. The method as claimed in claim 3, further comprising altering the requested content before delivery.

10. The method as claimed in claim 1, wherein the group is initially placed in the normal class.

11. The method as claimed in claim 1, wherein the step of classifying the group of clients includes receiving client characterization information from at least one member of the group.

12. The method as claimed in claim 1, wherein the step of classifying the group of clients includes measuring a time between accepting a TCP connection from the member of the group and receipt of a first HTTP request from that member.

13. The method as claimed in claim 1, wherein the step of classifying the group of clients includes the steps of:
in response to a client request from a member of the group, sending a redirect response, and
measuring a time between the client request and a redirected client request from the member.

14. The method as claimed in claim 1, wherein the step of classifying the group of clients includes measuring a time between transmittal of a container document to a member of the group and receipt of a first request for an object in the document.

15. The method as claimed in claim 1, wherein the step of classifying the group of clients includes measuring a time between transmittal of a container document to a member of the group and receipt of a last request for an object in the document.

16. The method as claimed in claim 1, wherein the step of classifying the group of clients includes measuring a criterion based on of a plurality of server requests.

17. The method as claimed in claim 16, wherein a criterion value $E_{first}$ is adjusted based on a new measurement $E_{measured}$ according to a formula:

$$E_{first} = \alpha E_{first} + (1-\alpha) E_{measured}$$

wherein α is a smoothing value in a range from 0 to 1.

18. The method as claimed in claim 1, wherein the client group comprises a cluster of clients under common administrative control.

19. The method as claimed in claim 1, further comprising the steps of generating a cookie containing a result of the classification step, and transmitting the cookie to the first client.

20. The method as claimed in claim 1, wherein the step of classifying the group of clients includes transmitting an executable to at least one of the clients for measuring the criterion indicative of the connection.

21. The method as claimed in claim 1, wherein the step of altering the response to the client request includes maintaining the content without alteration.

22. A server for delivering content to a first client through a connection, the server configured to perform the steps of:
forming a group of clients including the first client by processing the IP addresses of the clients according to a radix encoded trie classification process;
classifying the group of clients into a group classification according to at least one criterion indicative of at least one connection through which content is delivered to at least one member of the group other than the first client; including placing the group in one of a poor, a normal and a rich class;
receiving a request from the first client to serve content through the first connection;
altering a response to the client request in accordance with the group classification; and
sending the response to the client.

23. The server as claimed in claim 22, wherein the step of altering the response comprises altering the content to be delivered.

24. The server as claimed in claim 22, wherein the step of altering the response comprises altering the manner in which the content is to be delivered.

25. The server as claimed in claim 24, wherein the step of altering the manner of delivery comprises redirecting the client to a mirror server.

26. The server as claimed in claim 24, wherein the step of altering the manner of delivery comprises altering meta-information delivered with the content.

27. The server as claimed in claim 26, wherein the step of altering meta-information results in extending a freshness lifetime of an object in the content.

28. The server as claimed in claim 26, wherein the step of altering meta-information results in altering a policy of including cache validation requests with other messages exchanged with a server.

29. The server as claimed in claim 24, wherein the step of altering the manner of delivery comprises increasing a length of allowed TCP sessions.

30. The server as claimed in claim 24, wherein the step of altering the response further comprises altering the requested content before delivery.

31. The server as claimed in claim 22, wherein the group is initially placed in the normal class.

32. The server as claimed in claim 22, wherein the step of classifying the group of clients includes receiving client characterization information from at least one member of the group.

33. The server as claimed in claim 22, wherein the step of classifying the group of clients includes measuring a time between accepting a TCP connection from a member of the group and receipt of a first HTTP request from that member.

34. The server as claimed in claim 22, wherein the step of classifying the group of clients includes the steps of:
in response to a client request from a member of the group, sending a redirect response, and
measuring a time between the client request and a redirected client request from the member.

35. The server as claimed in claim 22, wherein the step of classifying the group of clients includes measuring a time between transmittal of a container document to a member of the group and receipt of a first request for an object in the document.

36. The server as claimed in claim 22, wherein the step of classifying the group of clients includes measuring a time between transmittal of a container document to a member of the group and receipt of a last request for an object in the document.

37. The server as claimed in claim 22, wherein the step of classifying the group of clients includes measuring a criterion based on of a plurality of server requests.

38. The server as claimed in claim 37, wherein a criterion value $E_{first}$ is adjusted based on a new measurement $E_{measured}$ according to a formula:

$$E_{first} = \alpha E_{first} + (1-\alpha) E_{measured}$$

wherein $\alpha$ is a smoothing value in a range from 0 to 1.

39. The server as claimed in claim 22, wherein the client group comprises a cluster of clients under common administrative control.

40. The server as claimed in claim 22, further configured to perform the steps of generating a cookie containing a result of the classification step, and transmitting the cookie to the first client.

41. The server as claimed in claim 22, wherein the step of classifying the group of clients includes transmitting an executable to at least one of the clients for measuring the criterion indicative of the connection.

42. The server as claimed in claim 22, wherein the step of altering the response to the client request includes maintaining the content without alteration.

* * * * *